UNITED STATES PATENT OFFICE.

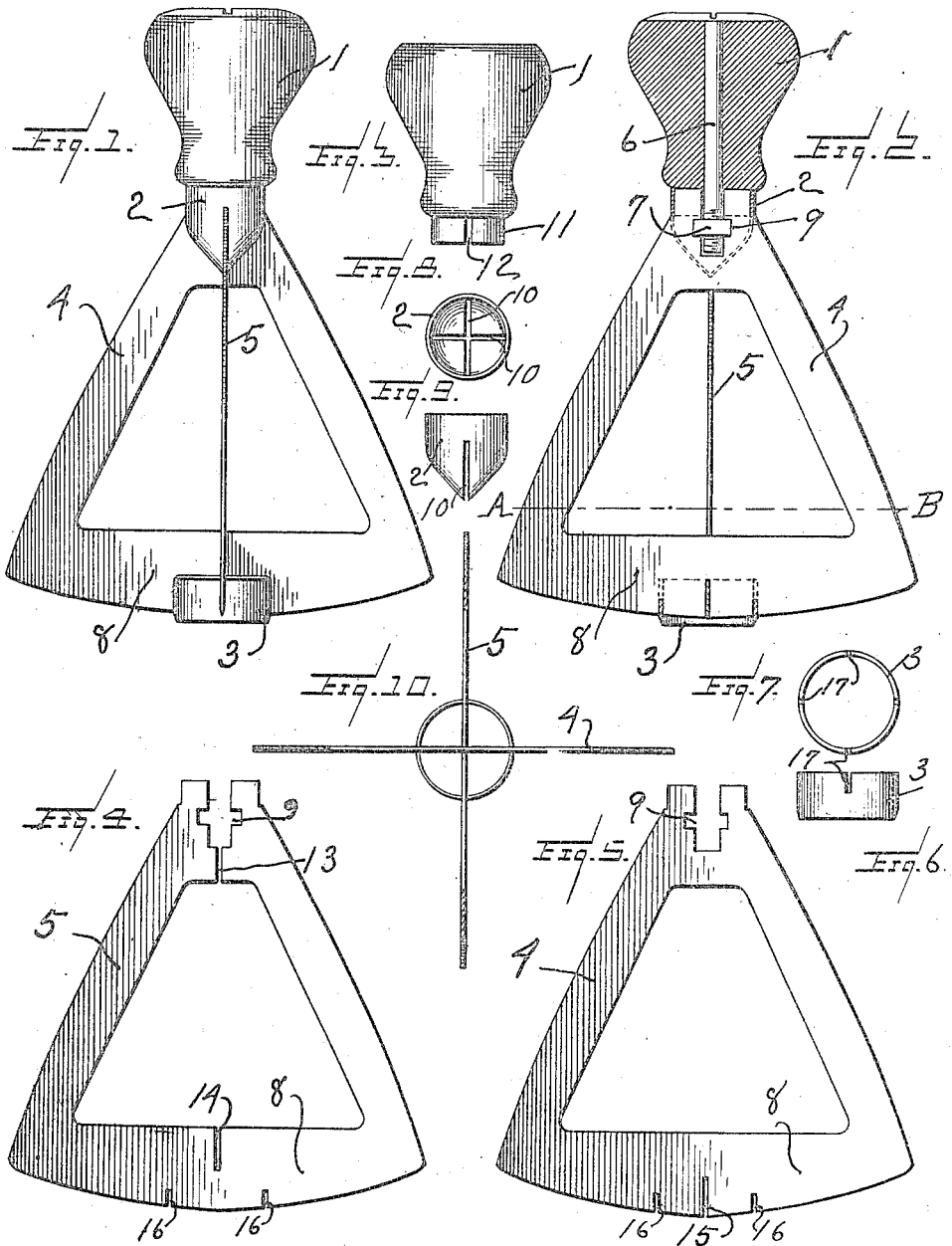

BENJAMIN FULLMER AND ALFRED HUGH POWELL, OF ALPINE CITY, UTAH.

APPLE CUTTER AND CORER.

975,410.   Specification of Letters Patent.   Patented Nov. 15, 1910.

Application filed January 31, 1910. Serial No. 541,193.

*To all whom it may concern:*

Be it known that we, BENJAMIN FULLMER and ALFRED H. POWELL, citizens of the United States, residing at Alpine City, in the county of Utah, State of Utah, have invented certain new and useful Improvements in Apple Cutters and Corers, of which the following is a description, reference being had to the accompanying drawings, forming a part hereof.

Our invention relates to an improved cutting and coring device for use in dividing an apple or other fruit having a central core or seed to be removed into parts and separating the core or seed from the remaining portions by one single cutting operation, our improved device comprising a single unitary implement for accomplishing the end above stated; and the object of our invention is to provide a simple and strong and effective implement for the purpose stated, and one which may be readily manufactured and which may be kept clean by a minimum of effort on the part of the user.

We have illustrated an embodiment of our invention in the accompanying drawing and described the same in the following specification and particularly pointed out the features wherein our invention consists in the concluding claim.

In the drawing; Figure 1 is a view showing our device in side elevation; Fig. 2 is a view showing the handle of our device and the means whereby the same is attached to the blades in section; Fig. 3 is a view showing the handle in side elevation; Figs. 4 and 5 are views showing the two cutting or slicing blades of our device in elevation; Figs. 6 and 7 are views showing the annular coring knife in side elevation and in plan; Figs. 8 and 9 are views showing a ferrule forming a part of our device in plan and side elevation, and; Fig. 10 is a view showing a section upon a horizontal plane indicated by the line A—B of Fig. 2.

In the drawing, 4 and 5 are two slicing blades arranged at right angles to one another in the implement when properly assembled, these blades being triangular in form and arranged with their apices upward and the lower transverse cutting portions 8 of which are sharpened and are preferably slightly convex as shown. The middle portion of the blank from which these blades are formed is cut away so as to leave an open space within the periphery of the blades and above the lower transverse cutting portions thereof in the device when in its finished condition. The blades are provided each with a recess 9 at its upper end which several recesses register with one another when the blades are in place and thereby form a single recess within which a threaded nut 7 lies when the parts are assembled, which nut is engaged by the threaded lower end of a bolt 6 whereby the blades and handle are secured together.

2 is a ferrule upon the lower end of the handle 1, the same being provided with slots 10 adapted to receive the upper ends of the blades 4, 5. The handle 1 is rabbeted at 11 to form a projection adapted to enter the upper end of the ferrule 2, and has slots 12 to receive the upper ends of the blades, all as shown in the drawing.

The blade 5 is cut to provide a slot at 13 and said blade is provided with an upwardly opening recess 14 in its lower transverse cutting edge 8, and the blade 4 is provided with a correspondingly located downwardly opening recess 15; from which it will be understood that the blade 5 in assembling the implement can be moved over the blade 4, this being permitted by the slot 13, and the nut 7 inclosed within the recesses 9 of both blades, the recesses 14, 15 securing a mutually interlocking action of the lower transverse portions 8 of the blades and the whole resulting in an extremely secure and rigid blade structure. The ferrule may then be placed upon the upper ends of the blades and the handle 1 secured in position by means of the bolt 6 as will be understood.

The coring function of our device is accomplished by means of an annular coring knife 3 secured to the central portion of the lower transverse cutting portions 8 of the slicing blades 4, 5, and the lower cutting edge of the coring knife is in substantially the same plane as abutting portions of the lower cutting edges of the transverse cutting portions of the said slicing blades, and in order to secure a more rigid construction the said portions 8 are provided with downwardly opening recesses 16 and the annular knife 3 with upwardly opening recesses 17, which recesses permit the annular coring knife and the slicing blades to interlock as will be understood and thereby secure a rigid structure and one not likely to become loose or displaced in use. The joints between the knife 3 and blades 4, 5, will also be brazed, and the joints between the blades 4 and 5 will also preferably be brazed to thereby more surely hold the several parts together.

It will be seen that in addition to an extremely rigid blade structure of the implement resulting from the features of construction above enumerated, the open structure resulting from the middle portion of the blades being cut away provides an implement which may very readily be kept clean, while the means provided for securing the blades to the handle is simple in form and at the same time results in a strong construction and one which permits the implement to be readily assembled and easily disassembled if desired.

While we have shown our invention as embodied in a structure having two blades intersecting at right angles, the distinguishing feature of our device so far as the arrangement of the blades is concerned is that the slitting blades are arranged in planes which radiate from a common axis, our invention being not necessarily limited to the definite number of blades, that is two, present in the device in which our invention is shown as embodied.

In use the device is placed against an apple with the point of intersection of the blades 4, 5 over the depression formed at the stem, or at the opposite end, and the implement forced through the apple. This action will divide the whole body of the apple, including the core portion, into four equal parts in the form of our device illustrated, and at the same time the annular coring knife 3 will cut the core free from the body portion of the apple, the result being that the outer or body portion is cut into equal parts each free from portions of the core and the central or core portion is by the same act cut free from the body portion into a corresponding number of parts. When the device has reached its lowest position the four parts of the body portion are easily separable from the core, and, indeed, will ordinarily fall away therefrom. The parts of the core itself, however, will be held together, by the annular coring knife which surrounds the lower end of the core, securely enough to permit the device and the core to be removed to a distance, whereupon a slight blow of the device as against a receptacle provided to receive the cores will jar the core free from the coring knife and permit it to fall away from the knife, the open construction of the slicing blades as above explained facilitating such action.

Having thus disclosed our invention and explained the mode of operation thereof, we claim and desire to secure by Letters Patent:—

An apple cutter and corer comprising a plurality of slicing blades of triangular form arranged with their apices upward and each formed with its central portion cut away to thereby provide a blade having an open and unobstructed central space above a lower transverse cutting portion, and said blades being also arranged in planes which intersect one another, said blades being each provided with a recess adjacent its upper end so located that the several recesses register and form a single recess when the blades are assembled; a nut within the recess formed as aforesaid; a handle; a bolt associated with said handle and the lower end of which is in engagement with said nut to thereby secure said blades and handle together; and an annular coring knife secured to the lower transverse cutting portions of said blades and centrally arranged with reference thereto and the cutting edge of which coring knife is in substantially the same plane as the cutting edges of the transverse cutting portions of said slicing blades.

This specification signed and witnessed this 10" day of January A. D. 1910.

BENJAMIN FULLMER.
ALFRED HUGH POWELL.

In the presence of—
JAMES CHIPMAN, Jr.,
H. C. JOHNSON.